US012730746B2

(12) United States Patent
Tiwari et al.

(10) Patent No.: US 12,730,746 B2
(45) Date of Patent: Sep. 8, 2026

(54) SEGREGATING LOGICAL TO PHYSICAL MAPPINGS

(71) Applicant: Micron Technology, Inc., Boise, ID (US)

(72) Inventors: Ritesh Tiwari, Bangalore (IN); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/776,215

(22) Filed: Jul. 17, 2024

(65) Prior Publication Data

US 2025/0117322 A1 Apr. 10, 2025

Related U.S. Application Data

(60) Provisional application No. 63/543,205, filed on Oct. 9, 2023.

(51) Int. Cl.
*G06F 12/02* (2006.01)

(52) U.S. Cl.
CPC ...... *G06F 12/0246* (2013.01); *G06F 12/0292* (2013.01); *G06F 2212/7201* (2013.01)

(58) Field of Classification Search
CPC ............ G06F 12/0246; G06F 12/0292; G06F 2212/1024; G06F 2212/1032; G06F 2212/7201; G06F 2212/7205; G06F 2212/7208; G06F 3/064; G06F 3/0659; G06F 3/0679
See application file for complete search history.

(56) References Cited

U.S. PATENT DOCUMENTS

2016/0162405 A1* 6/2016 Horn .................. G06F 12/0871 711/102
2018/0188970 A1* 7/2018 Liu ....................... G06F 3/0653

* cited by examiner

*Primary Examiner* — Yong J Choe
(74) *Attorney, Agent, or Firm* — Holland & Hart LLP

(57) ABSTRACT

Methods, systems, and devices for segregating logical to physical mappings are described. A memory system may segregate L2P mappings based on one or more characteristics of the data associated with to the L2P mappings. The memory system may determine whether a logical address included in a write command is associated with a first characteristic, a second characteristic, or some other characteristic. The memory system may write an L2P mapping to a first block of memory cells, a second block of memory cells, or some other block of memory cells based on the determined characteristic of the L2P mapping. The block of memory cells that the L2P mapping is written to may include other mappings having data with a same (or similar) characteristic.

19 Claims, 5 Drawing Sheets

Host System 205

Memory System 210

Memory System Controller 215

Non-Volatile Memory 220

Volatile Memory 225

230-a
230-b

| LBA-a | Data-a |
| --- | --- |
| LBA-b | Data-b |
| LBA-c | Data-c |
| LBA-d | Data-d |
| LBA-e | Data-e |
| LBA-f | Data-f |
| LBA-g | Data-g |

240

| Block 235-a | | |
| --- | --- | --- |
| LBA-a | PBA-a | Indication-a |
| LBA-d | PBA-d | Indication-d |
| LBA-f | PBA-f | Indication-f |
| LBA-g | PBA-g | Indication-g |
| | | |

Parity Data 255

| Block 235-b | | |
| --- | --- | --- |
| LBA-b | PBA-b | Indication-b |
| LBA-c | PBA-c | Indication-c |
| LBA-e | PBA-e | Indication-e |
| | | |
| | | |

245 250

First characteristic 260

Second characteristic 265

200

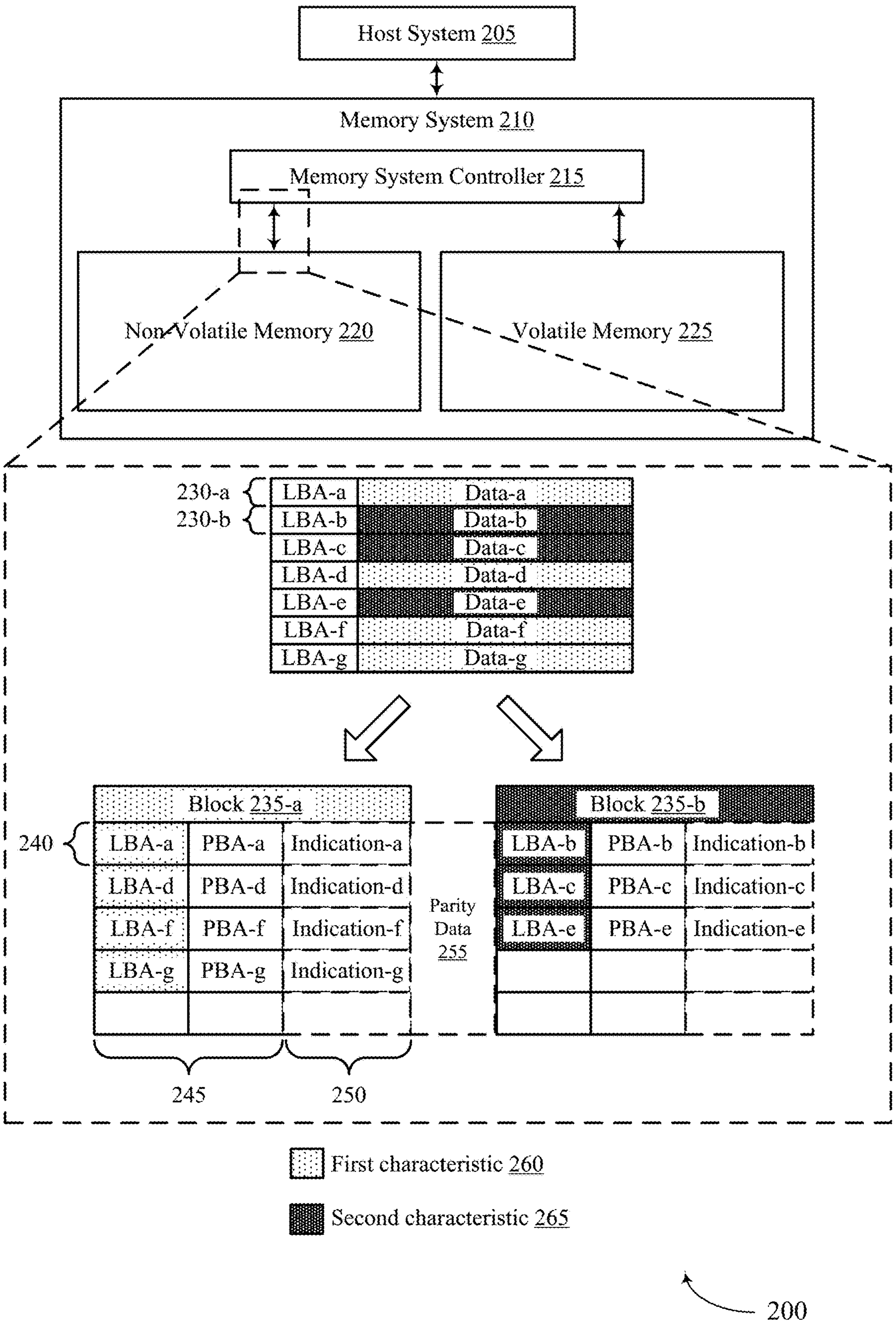

FIG. 2

Host System 305

Memory System 310

Memory System Controller 315

First Block 335-a

Second Block 335-b

320 Write Command

325 Determine Quantity of Access Operations

330 Determine LBA Characteristic

340 Write L2P Mapping

345 Write Indication

350 Write L2P Mapping

355 Write Indication

Receive, at a memory system, a write command that includes data and a logical address corresponding to a physical address associated with the memory system

505

Determine whether the logical address is associated with a first characteristic based on receiving the write command, where the first characteristic is associated with a quantity of access operations performed on the logical address satisfying a threshold value

510

Write, to a first block of memory cells of the memory system, a mapping between the logical address and the corresponding physical address based on determining that the logical address is associated with the first characteristic

515

500

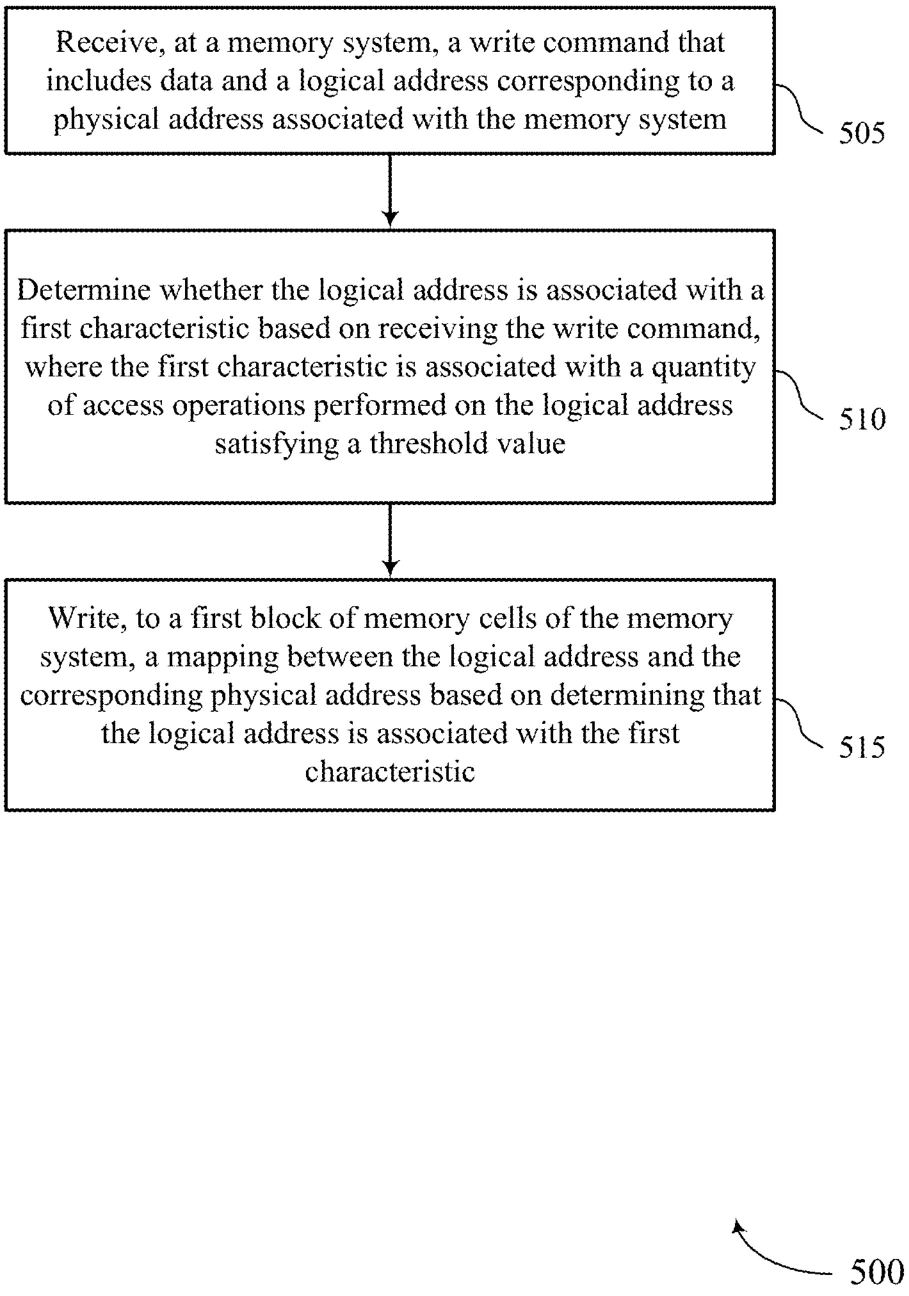

FIG. 5

SEGREGATING LOGICAL TO PHYSICAL MAPPINGS

CROSS REFERENCE

The present application for patent claims priority to U.S. Patent Application No. 63/543,205 by Tiwari et al., entitled "SEGREGATING LOGICAL TO PHYSICAL MAPPINGS," filed Oct. 9, 2023, which is assigned to the assignee hereof, and which is expressly incorporated by reference in its entirety herein.

TECHNICAL FIELD

The following relates to one or more systems for memory, including segregating logical to physical mappings.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 2 shows an example of a system that supports segregating logical to physical mappings in accordance with examples as disclosed herein.

FIG. 5 shows a flowchart illustrating a method or methods that support segregating logical to physical mappings in accordance with examples as disclosed herein.

DETAILED DESCRIPTION

Figure 1:
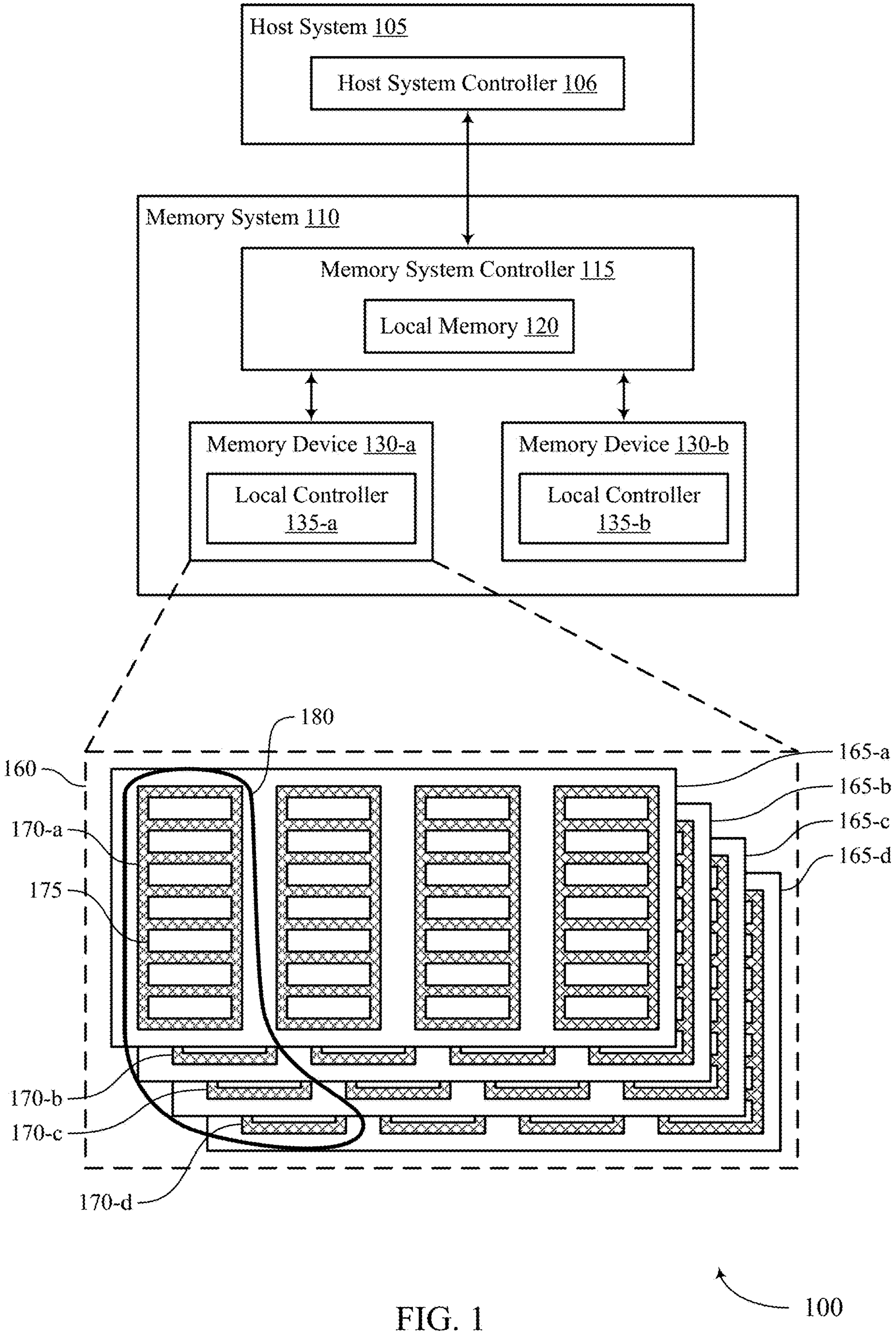
FIG. 1 shows an example of a system that supports segregating logical to physical mappings in accordance with examples as disclosed herein.

Some memory systems may utilize logical-to-physical (L2P) mappings to define one or more address relationships (e.g., translations) between a logical block address (LBA) (e.g., received from a host) and a physical block address (PBA) (e.g., of a memory system). Data corresponding to an L2P mapping may be associated with one or more characteristics. For example, data may be associated with a quantity of access operations performed within a duration of time (e.g., a temperature characteristic). A first characteristic (e.g., a first temperature) may correspond to data associated with a relatively high quantity of access operations (e.g., hot data), and a second characteristic (e.g., a second temperature) may correspond to data associated with a relatively low quantity of access operations (e.g., cold data).

In some systems, however, storing a mixture of data associated with the first characteristic and the second characteristic in a same block of memory may result in additional maintenance operations (e.g., garbage collection operations) being performed, which may lead to reduced system endurance, reduced quality of service (QOS), increased write amplification, increased latency, and other similar effects. Thus, a memory system may segregate (e.g., organize, divide) data associated with the first characteristic and data associated with the second characteristic. However, the memory system may not segregate the L2P mappings (e.g., L2P data) based on the first characteristic and the second characteristic, which may lead similar effects on the memory system.

According to aspects described herein, a memory system may segregate (e.g., organize, divide) L2P mappings based on a characteristic, such as a temperature characteristic, of the data corresponding to the L2P mapping. In some examples, the temperature characteristic may correspond to a quantity of access operations associated with the L2P mapping. The memory system may access (e.g., open) a first block of memory to store L2P mappings associated with a first characteristic (e.g., hot data, more-frequently-accessed data), and a second block of memory to store L2P mappings associated with a second characteristic (e.g., cold data, less-frequently-accessed data). In some examples, the memory system may store an indication of a respective quantity of access operations (e.g., modify access operations) with or associated with each L2P mapping, which may help maintain the segregation of the L2P data. Segregating the L2P mappings based on the first characteristic and the second characteristic may reduce a quantity of maintenance operations performed, improve overall system endurance, and increase a quality of service, among other benefits.

In addition to applicability in memory systems as described herein, techniques for segregating L2P mappings may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by improving memory access speeds, which may decrease processing or latency times, improve response times, or otherwise improve user experience, among other benefits.

In addition to applicability in memory systems as described herein, techniques for segregating L2P mappings may be generally implemented to support artificial intelligence applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory devices capable of effectively and efficiently storing relatively large quantities of data or accessing stored data relatively quickly. Implementing the techniques described herein may improve the performance of electronic devices by improving memory access speeds, which may decrease processing or latency times, improve response times, or otherwise improve user experience, among other benefits.

Features of the disclosure are initially described in the context of a system with reference to FIG. 1. Features of the disclosure are described in the context of a system and a process flow with reference to FIGS. 2 and 3. These and other features of the disclosure are further illustrated by and described in the context of an apparatus diagram and flowchart that relate to segregating L2P mappings with reference to FIGS. 4 and 5.

FIG. 1 shows an example of a system 100 that supports segregating logical to physical mappings in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support segregating logical to physical mappings. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

According to aspects described herein, the memory system 110 may segregate (e.g., organize, divide) L2P mappings based on a temperature characteristic of the data corresponding to the L2P mapping. The temperature characteristic may correspond to a quantity of access operations associated with the L2P mapping. The memory system may open a first block of a memory device 130 to store L2P mappings associated with a first characteristic (e.g., hot data, more-frequently-accessed data) and a second block of a memory device 130 to store L2P mappings associated with a second characteristic (e.g., cold data, less-frequently-accessed data). In some examples, the memory system 110 may store an indication of a respective quantity of access operations with each L2P mapping, which may help maintain the segregation of the L2P data. Segregating the L2P mappings based on the first characteristic and the second characteristic may reduce the quantity of maintenance operations performed, improve overall endurance, and increase QoS of the memory system 110, among other benefits.

FIG. 2 shows an example of a system 200 that supports segregating L2P mappings in accordance with examples as disclosed herein. The system 200 may implement aspects of a system 100, as described with reference to FIG. 1. For example, the system 200 may include a host system 205 and a memory system 210, which may be examples of a host system 105 and a memory system 110. The system 200 may include a memory system 210 operable to communicate with the host system 205 via a memory system controller 215. For example, the memory system controller 215 may be operable to perform operations on the memory system 210 in accordance with commands from the host system 205. The system 200 may illustrate a sequence of write commands 230 (e.g., received from the host system 205). Each write command 230 may include a respective LBA (e.g., LBA-a, LBA-b, etc.) and data associated with the LBA (e.g., Data-a, Data-b, etc.). The memory system 210 may segregate (e.g., organize, divide) L2P mappings associated with the write commands 230 based on a temperature characteristic of the data, which may reduce the quantity of maintenance operations performed, improve overall endurance, and increase QoS of the memory system 210, among other benefits.

The memory system 210 may include non-volatile memory 220 and volatile memory 225, which may be examples of respective memory devices 130, as described with reference to FIG. 1. In some cases, the memory system controller 215 may receive one or more write commands 230 (e.g., from the host system 205). The memory system controller 215 may determine to write the data associated with the write command 230 to a block of memory cells in the non-volatile memory 220. The memory system controller 215 may determine a PBA of a block of memory cells to write the data to based on an LBA included in the write command 230. The association between the LBA and the PBA may define a mapping, which may be referred to as an L2P mapping 240. The memory system controller 215 may write the L2P mapping 240 to a block of memory cells in the non-volatile memory 220 or the volatile memory 225.

In some cases, an L2P region corresponding to the L2P mapping 240 may be associated with one or more characteristics. In some cases, the one or more characteristics may correspond to a quantity of access operations associated with the LBA (e.g., the LBA having undergone the quantity of access operations), the data, or both. Access operations may refer to operations such as writing data, erasing data, refreshing data, or other such operations. As described herein, an L2P mapping 240 may be associated with a characteristic (e.g., a temperature characteristic) based on a quantity of access operations performed during a duration of time. For example, a quantity of access operations may be considered 'hot' based on the quantity satisfying a threshold value within a duration of time (e.g., first duration), and may be considered 'cold' based on the quantity failing to satisfy the threshold value, satisfying a different threshold value, or both. Additionally, or alternatively, a quantity of access operations may be associated with other temperature characteristics (e.g., a warm characteristic) based on satisfying or failing to satisfy some threshold value.

Additionally, or alternatively, in some examples, the characteristic may be based on a duration between access operations. For example, the characteristic may be based on a duration between a first write operations and a second write operation on the L2P mapping, a duration between a write operation and an unmap operation (e.g., erase, invalidate) on the L2P mapping 240, or the like. A relatively low duration between access operations may be associated with a first characteristic (e.g., a hot characteristic), and a relatively high duration between access operations may be associated with a second characteristic (e.g., a cold characteristic).

In some examples, a first characteristic 260 (e.g., a hot characteristic) may be associated with a relatively high quantity of access operations performed on the L2P mapping 240 within a duration of time, and a second characteristic 265 (e.g., a cold characteristic) may be associated with a relatively low quantity of access operations performed on the L2P mapping 240 within the duration of time. For example, the first characteristic 260 may correspond to a quantity of access operations that satisfies a first threshold value. The second characteristic 265 may correspond to a quantity of access operations that fails to satisfy the first threshold value, or that satisfies a second threshold value different than (e.g., smaller than) the first threshold value, or both.

The first characteristic 260 and the second characteristic 265 may further be related to a validity associated with the data (e.g., likelihood for the data to be invalidated sooner or later). For example, data associated with the second characteristic 265 may be invalidated relatively sooner than data associated with the first characteristic 260. Storing a mixture of data associated with the first characteristic 260 and the second characteristic 265 together in a same region of memory may result in additional maintenance operations (e.g., extra garbage collection operations), which may negatively impact system endurance, increase latency and write amplification effects, and decrease overall quality of service (QOS) of the memory system 210.

In some cases, such negative system effects may increase for a memory system 210 that stores data to QLCs (e.g., due to lower relative endurance and performance as compared to TLC, or other cell types). To improve efficiency of the memory system 210, the memory system controller 215 may segregate data (e.g., host data) based on the data being associated with the first characteristic 260 (e.g., hot data), or the second characteristic 265 (e.g., cold data). Moreover, the memory system controller 215 may segregate L2P mappings 240 based on such temperature characteristics (e.g., based on hotness or temperature of host data referred to by the L2P mapping 240), which may reduce the quantity of maintenance operations performed, improve overall endurance, and increase QoS of the memory system 210, among other benefits.

According to aspects described herein, the memory system controller 215 may identify and segregate (e.g., separate, divide, organize) an L2P mapping 240 based on a temperature characteristic of the data associated with the L2P mapping (e.g., L2P region). As used herein, a temperature characteristic may refer to a quantity of access operations performed within a duration of time. A first characteristic (e.g., a first temperature) may correspond to data associated with a relatively high quantity of access operations (e.g., hot data), and a second characteristic (e.g., a second temperature) may correspond to data associated with a relatively low quantity of access operations (e.g., cold data). Additionally or alternatively, access frequency may refer to a frequency at which access operations are performed. For example, access operations may be performed at a first access frequency (e.g., within a relatively short duration) or at a second frequency (e.g., within a relatively longer duration), among other possibilities.

The memory system controller 215 may open multiple blocks 235 (e.g., blocks of memory cells) for writing one or more L2P mappings 240. For example, the memory system controller 215 may open a first block 235-*a* for writing L2P mappings associated with the first characteristic 260 (e.g., hot data) and a second block 235-*b* for writing L2P mappings 240 associated with the second characteristic 265 (e.g., cold data). The memory system controller 215 may open blocks 235 in the non-volatile memory 220 as shown in the system 200, or open the blocks 235 in the volatile memory 225 (not shown), or both. In some examples, the block 235-*a* and the block 235-*b* may share parity data 255 (e.g., exclusive-or (XOR) parity data) to conserve space in the memory system 210 (e.g., in SRAM).

The memory system controller 215 may receive a write command 230-*a* and a write command 230-*b*. The write command 230-*a* may include LBA-a and Data-a which may be associated with the first characteristic 260 (e.g., hot data), and the write command 230-*b* may include LBA-b and Data-b which may be associated with the second characteristic 265 (e.g., cold data). In some cases, the host system 205 may include an indication (e.g., a tag) of whether the write command 230 is associated with the first characteristic 260, or the second characteristic 265, or some other temperature characteristic. Additionally, or alternatively, the memory system controller 215 may determine the temperature characteristic associated with the write command 230 based on monitoring a quantity of access operations associated with the LBA during a duration of time.

The memory system controller 215 may determine that LBA-a and Data-a are associated with the first characteristic 260 and that LBA-b and Data-b are associated with the second characteristic 265. The memory system controller 215 may write Data-a to memory cells corresponding to PBA 0 and Data-b to memory cells corresponding to PBA 1. Based on LBA-a being associated with the first characteristic 260 and LBA-b being associated with the second characteristic 265, the memory system controller 215 may store a first L2P mapping 240 (e.g., corresponding to Data-a) to block 235-*a* and a second L2P mapping (e.g., corresponding to Data-b) to block 235-*b*. Thus, the memory system controller 215 may store the first L2P mapping 240 and the second L2P mapping 240 to different blocks 235 based on a temperature characteristic of their respective L2P regions. Similarly, the memory system controller 215 may determine that LBA-d/Data-d, LBA-f/Data-f, and LBA-g/Data-g are associated with the first characteristic 260, and that LBA-c/Data2 and LBA-e/Data-e are associated with the second characteristic 265. Accordingly, the memory system controller 215 may write respective L2P mappings 240 for Data-d, Data-f, and Data-g to the block 235-*a*, and respective L2P mappings 240 for Data-c and Data-e to the block 235-*b*.

In some examples, writing the L2P mapping 240 may include writing L2P data 245, which may be the association between an LBA and a corresponding PBA, and an indication 250 (e.g., Indication-a). The indication 250 may include a quantity (e.g., a count) of access operations associated with the L2P region (e.g., 4 kilobyte (KiB) region, 2KiB region, etc.) corresponding to the L2P mapping 240. Additionally, or alternatively, the memory system controller 215 may write the indication 250 to a dedicated block (not shown), or may store the indication 250 as metadata with the associated L2P mapping 240 (e.g., to the block 235-*a*, the block 235-*b*, some other block). The memory system controller 215 may monitor the quantity of access operations associated with the L2P data 245 and may update the indication 250 based on the monitoring.

Additionally, or alternatively, the memory system controller 215 may receive a command to update the indication 250. In some examples, the memory system controller 215 may update whether an L2P mapping 240 is associated with the first characteristic 260, the second characteristic 265, or some other characteristic based on the updated indication 250. For example, an L2P mapping 240 with an indication 250 may be associated with the second characteristic 265. The memory system controller 215 may receive a command to update the indication 250, and the memory system controller 215 may determine to move the L2P mapping 240 to a different location (e.g., to the block 235-*a*) based on the updated indication 250.

In some examples, the memory system controller 215 may also monitor a quantity (e.g., store a count) of L2P mappings 240 associated with each temperature characteristic in a given L2P table (e.g., 4KiB table). Storing the quantity of L2P mappings 240 associated with each temperature may use a relatively low amount of storage space in the memory system 210 (e.g., due to the File System flagging data per 2 megabyte (MB) segment). For example, the memory system controller 215 may use one or more bits (e.g., 10 bits) to store the quantity of L2P mappings 240 associated with each temperature (e.g., hot, cold, or some other temperature) for an L2P table. The one or more bits may be stored in one along with the L2P mappings 240 (e.g., with upper level L2P pointers), stored as metadata, or any combination thereof.

In some examples, an L2P table may be stored to the non-volatile memory 220. That is, a portion of the L2P table may be stored to the volatile memory 225 and the complete L2P table (e.g., the full L2P table) may be stored to the non-volatile memory due to storage constraints of the volatile memory 225. In some instances, the L2P mappings stored to the volatile memory 225 may be used to update the L2P table stored to the non-volatile memory 220 and vice versa. For example, the L2P table stored to the non-volatile memory 220 may be updated with the L2P mappings 240 (and the respective indications 250) stored to the blocks 235 of the volatile memory 225. The indications 250 may be stored such that, when mappings are loaded from the non-volatile memory 220 to the volatile memory 225, the respective L2P mappings 240 may be stored to a block 235 based on the respective characteristic (e.g., whether the associated data is hot or cold).

In some examples, the memory system controller 215 may separately execute or manage maintenance operations on the block 235-*a* and the block 235-*b*. Examples of maintenance operations may be garbage collection operations, L2P compression operations, data caching operations (e.g., hot data caching), and L2P read ahead techniques, among other operations. Segregating the L2P mappings, as described herein, may enable to the memory system controller 215 to separately perform such maintenance operations on the block of memory cells 335-*a* and the block of memory cells 335-*b* to increase efficiency. For example, the indications 250 may enable a garbage collection operation to more efficiently segregate data according to a temperature characteristic.

Segregating L2P mappings 240 may further enable the memory system 210 to maintain frequently accessed L2P mappings 240 (e.g., hot L2P mappings) in the volatile memory 225 (e.g., SRAM), which may increase overall QoS. For example, the memory system controller 215 may determine to maintain the block 235-*a* in the volatile memory 225 and may store the block 235-*b* in the non-volatile memory 220 based on the temperature characteristic. Segregating the L2P mappings 240 between the different blocks 235 may provide other benefits such as reduced write amplification, reduced excessive write operations (e.g., improvement in total terabytes written (TBW)), enabling wear-leveling operations (e.g., static garbage collection), and other benefits, which may improve the endurance and increase the QoS of the memory system 210.

Figure 3:
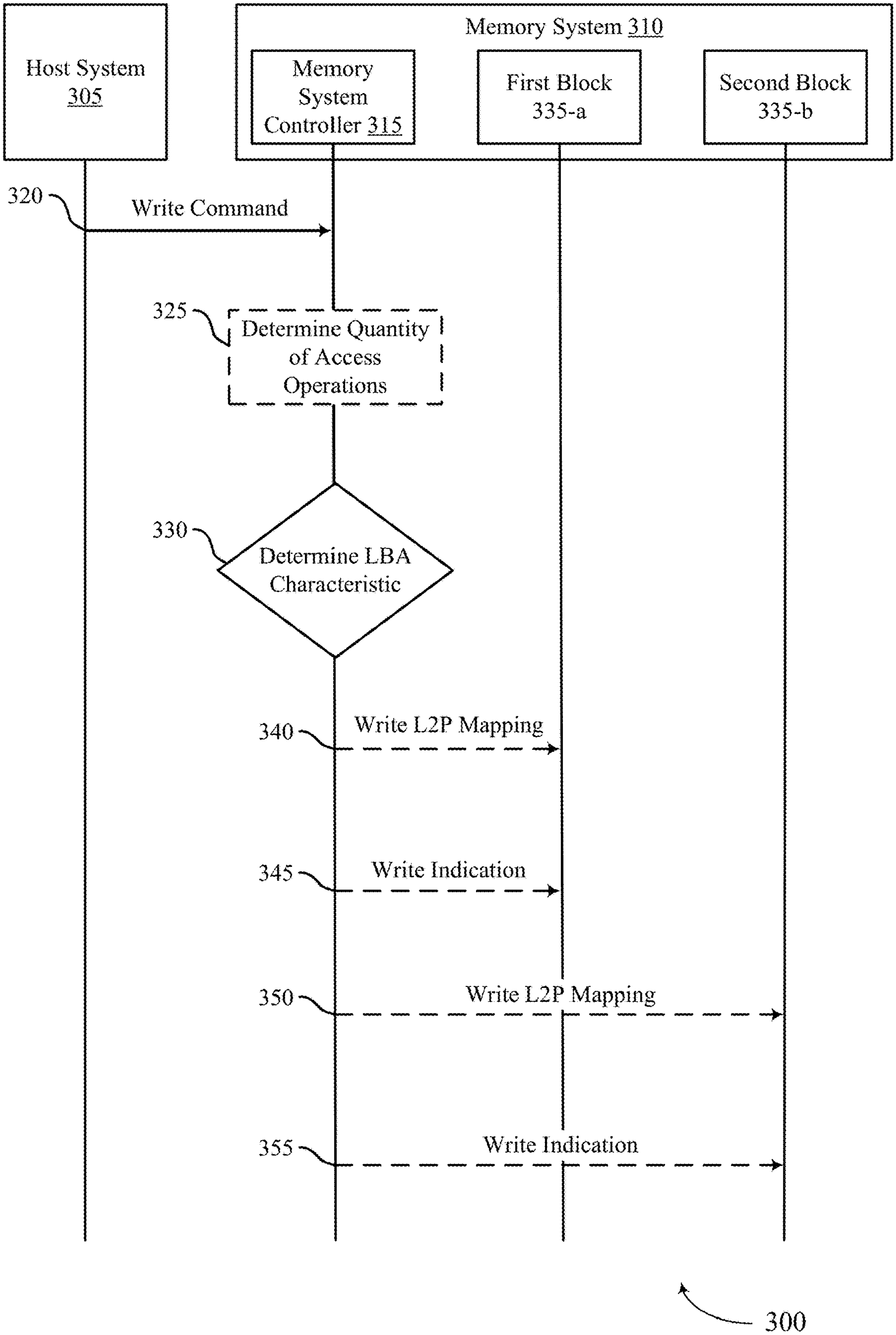
FIG. 3 shows an example of a process flow that supports segregating logical to physical mappings in accordance with examples as disclosed herein.

FIG. 3 shows an example of a process flow 300 that supports segregating L2P mappings in accordance with examples as disclosed herein. The process flow 300 may illustrate aspects or operations of the system 200 as described with reference to FIG. 2. For example, the process flow 300 may depict operations at a host system 305 and a memory system 310, which may be examples of a host system 205 and a memory system 210, respectively, as described with reference to FIG. 2. In accordance with operations as described herein, the memory system 310 may include a memory system controller 315, a first block of memory cells 335-*a*, and a second block of memory cells 335-*b*. The memory system 310 may segregate (e.g., organize, divide) L2P mappings associated with the write commands based on a temperature characteristic of the data, which may reduce the quantity of maintenance operations performed, improve overall endurance, and increase QoS of the memory system 310, among other benefits.

In the following description of the process flow 300, the methods, techniques, processes, and operations may be performed in different orders or at different times. Further, certain operations may be left out of the process flow 300, or other operations may be added to the process flow 300.

At 320, a write command may be received. In some examples, the memory system 310 (e.g., memory system controller 315) may receive the write command that includes data and a logical address (e.g., an LBA) corresponding to a physical address (e.g., a PBA) associated with the memory system 310. The command may be received from the host system 305 and the data in the write command may be host data for intended for storage at the memory system 310. The data, the LBA, or both may be associated with a temperature characteristic (e.g., a first characteristic 260, or a second characteristic 265 as described with reference to FIG. 2). In some examples, the write command (e.g., from the host system 305 may indicate that the logical address is associated with a first characteristic (e.g., a hot temperature characteristic), a second characteristic (e.g., a cold temperature characteristic), or some other characteristic (e.g., a different temperature characteristic). For example, the host system 305 may indicate a data temperature characteristic (e.g., a stream identifier (ID)) via a field (e.g., a group ID field) in the write command.

In some examples, the write command at 320 may include an update command to update a quantity of access operations associated with a logical address. For example, the memory system controller 315 may receive a command (e.g., an updated command included in the write command) based on writing (e.g., previously writing) a mapping between the logical address and the corresponding physical address to the first block of memory cells 335-*a*, the second block of memory cells 335-*b*, or some other block.

At 325, a quantity of access operations associated with the logical address may be determined. An access operation may be a read operation, write operation, erase operation, refresh operation, or some other such operation. In some examples, the memory system controller 315 may determine the quantity of access operations associated with the logical address included in a write command. For example, the memory system controller 315 may determine the quantity of access operations associated with the LBA received at 320. In some examples, the memory system controller 315 may determine the quantity of access operations based on information received in the write command received at 320 (e.g., stream ID), or based on other information at the memory system 310 (e.g., heuristic information or pre-existing information). In some examples, an updated quantity of access operations associated with the logical address may be determined. For example, the memory system controller 315 may determine an updated quantity of access operations associated with a logical address based on receiving a command (e.g., the write command at 320).

At 330, a determination whether the logical address is associated with a first characteristic, a second characteristic, or some other characteristic may be made. For example, the memory system controller 215 may determine whether the logical address is associated with the first characteristic, the second characteristic, or some other characteristic based on receiving the write command at 320. The first characteristic may include logical addresses having undergone a first threshold quantity of access operations, and a second characteristic may include logical addresses having undergone a second threshold quantity of access operations different than the first threshold quantity of access operations. The first characteristic may be associated with a quantity of access operations performed on the logical address satisfying a threshold value. The threshold value may include a quantity of access operations performed within a duration of time.

In some examples, the memory system controller 315 may determine whether the logical address is associated with the first characteristic or the second characteristic based on whether the quantity of access operations satisfies the threshold value. For example, the logical address may be associated with the first characteristic based on the quantity of access operations satisfying the threshold value, and the logical address may be associated with a second characteristic based on the quantity of access operations failing to satisfy the threshold value. Additionally, or alternatively, the memory system controller 315 may determine that the logical address is associated with a second characteristic based on determining that the logical address is not associated with the first characteristic or determining that the quantity of access operation satisfies a different threshold value.

In some examples, the memory system controller 315 may determine whether the logical address is associated with the first characteristic, the second characteristic, or some other characteristic may be based on receiving the command (e.g., the indication) from the host system 305 at 320. Additionally, or alternatively, the memory system controller 315 may determine whether the logical address is associated with the first characteristic, the second characteristic, or some other characteristic may be based on monitoring the quantity of access operations associated with the logical address.

At 340, a mapping may be written to a first block of memory cells 335-*a*. In some examples, the memory system controller 315 may write, to the first block of memory cells 335-*a* of the memory system 310, the mapping between the logical address and the corresponding physical address based on determining that the logical address is associated with the first characteristic at 330. In some examples, exclusive-or (XOR) parity data may be shared between the first block of memory cells 335-*a* and a second block of memory cells 335-*b* based on the memory system controller 315 writing the mapping between the logical address and the corresponding physical address to the first block of memory cells 335-*a*, a second block of memory cells 335-*b*, or both.

At 345, an indication of the quantity of access operations may be written to the first block of memory cells 335-*a*. For example, the memory system controller 315 may write an indication of the quantity of access operations associated with the logical address to the first block of memory cells 335-*a* based on writing the mapping between the logical address and the corresponding physical address to the first block of memory cells 335-*a*. In some examples, an indication of an updated quantity of access operations may be written based on determining the updated quantity of access operations associated with the logical address at 325. In some examples, the memory system controller 315 may determine to move (e.g., rewrite) an L2P mapping associated with the updated quantity of access operations to a different block of memory cells in the memory system 310 based on the updated quantity of access operations. In some examples, the memory system controller 315 may write the indication of the quantity of access operations (e.g., or the updated quantity of access operations) as metadata to the first block of memory cells 335-*a* (e.g., as a flag in an L2P table, in spare bits of NAND page along with L2P data), or as data (e.g., pointed data) in the first block of memory cells 335-*a* (e.g., as a bitmap in a different page of memory than the L2P data), or a different block of memory cells (not shown) of the memory system 310.

At 350, a mapping between the logical address and the corresponding physical address may be written to a second block of memory cells 335-*b*. In some examples, the memory system controller 315 may write, to a second block of memory cells 335-*b* of the memory system 310, a mapping between the logical address and the corresponding physical address based on determining that the logical address is associated with the second characteristic at 330. In some examples, exclusive-or (XOR) parity data may be shared between the second block of memory cells 335-*b* and the first block of memory cells 335-*a* based at least in part on the memory system controller 315 writing the mapping between the logical address and the corresponding physical address.

At 355, an indication of the quantity of access operations associated with the logical address may be written to the second block of memory cells 335-*b*. For example, the memory system controller 315 may write an indication of a quantity of access operations associated with the logical address to the memory cells 335-*b* based on writing the mapping between the logical address and the corresponding physical address to the second block of memory cells 335-*b*. In some examples, an indication of an updated quantity of access operations may be written based on determining the updated quantity of access operations associated with the logical address at 325. In some examples, the memory system controller 315 may determine to move (e.g., rewrite) an L2P mapping associated with the updated quantity of access operations to a different block of memory cells in the memory system 310 based on the updated quantity of access operations. In some examples, the memory system controller 315 may write the indication of the quantity of access operations as metadata to the second block of memory cells 335-*b* (e.g., as a flag in an L2P table, in spare bits of NAND page along with L2P data), or as data (e.g., pointed data) in the second block of memory cells 335-*b* (e.g., as a bitmap in a different page of memory than the L2P data), or a different block of memory cells (not shown) of the memory system 310.

Segregating the L2P mappings between the different blocks 335 may provide benefits to the memory system 310, such as reduced write amplification, reduced excessive write operations (e.g., improvement in table terabytes written (TBW)), enabling wear-leveling operations (e.g., static garbage collection), and other benefits, which may improve the endurance and increase the QoS of the memory system 310.

Figure 4:
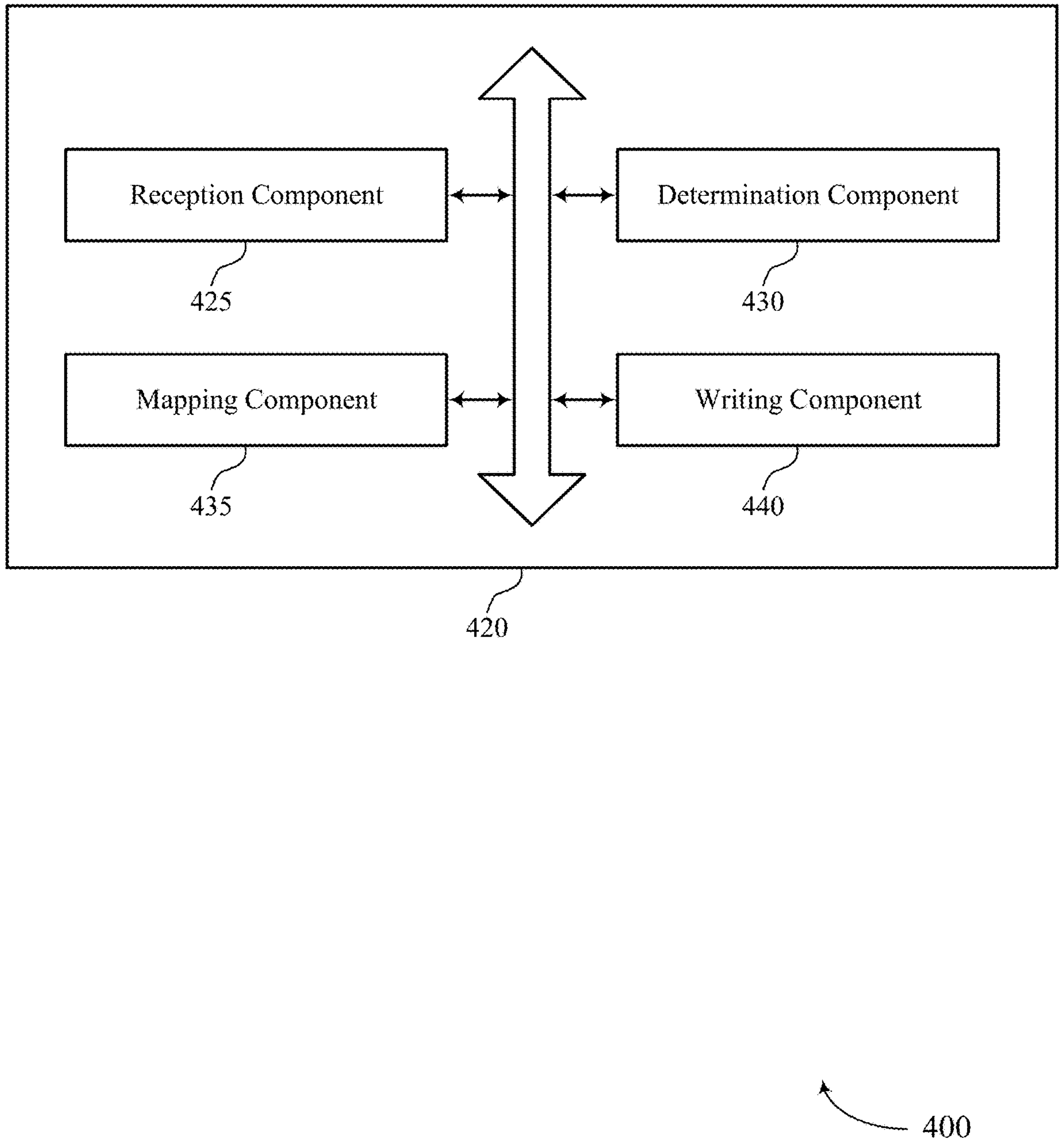
FIG. 4 shows a block diagram of a memory system that supports segregating logical to physical mappings in accordance with examples as disclosed herein.

FIG. 4 shows a block diagram 400 of a memory system 420 that supports segregating L2P mappings in accordance with examples as disclosed herein. The memory system 420 may be an example of aspects of a memory system as described with reference to FIGS. 1 through 3. The memory system 420, or various components thereof, may be an example of means for performing various aspects of segregating L2P mappings as described herein. For example, the memory system 420 may include a reception component 425, a determination component 430, a mapping component 435, a writing component 440, or any combination thereof. Each of these components may communicate, directly or indirectly, with one another (e.g., via one or more buses).

The reception component 425 may be configured as or otherwise support a means for receiving, at a memory system, a write command that includes data and a logical address corresponding to a physical address associated with the memory system. The determination component 430 may be configured as or otherwise support a means for determining whether the logical address is associated with a first characteristic based on receiving the write command, where the first characteristic is associated with a quantity of access operations performed on the logical address satisfying a threshold value. The mapping component 435 may be configured as or otherwise support a means for writing, to a first block of memory cells of the memory system, a mapping between the logical address and the corresponding physical address based on determining that the logical address is associated with the first characteristic.

In some examples, the determination component 430 may be configured as or otherwise support a means for determining that the logical address is associated with a second characteristic based on determining that the logical address is not associated with the first characteristic. In some examples, the mapping component 435 may be configured as or otherwise support a means for writing, to a second block of memory cells of the memory system, the mapping between the logical address and the corresponding physical address based on determining that the logical address is associated with the second characteristic.

In some examples, the writing component 440 may be configured as or otherwise support a means for writing, to the memory system, a first indication of a quantity of access operations associated with the logical address based on writing the mapping between the logical address and the corresponding physical address to the second block of memory cells. In some examples, the first indication of the quantity of access operations is written as metadata to the second block of memory cells or a third block of memory cells of the memory system.

In some examples, the mapping component 435 may be configured as or otherwise support a means for sharing exclusive-or (XOR) parity data between the first block of memory cells and the second block of memory cells based on writing the mapping between the logical address and the corresponding physical address to the first block of memory cells.

In some examples, the writing component 440 may be configured as or otherwise support a means for writing a second indication of a quantity of access operations associated with the logical address based on writing the mapping between the logical address and the corresponding physical address to the first block of memory cells, where the second indication of the quantity of access operations is written as metadata to the first block of memory cells or a fourth block of memory cells of the memory system.

In some examples, to support determining whether the logical address is associated with the first characteristic, the determination component 430 may be configured as or otherwise support a means for determining a quantity of access operations associated with the logical address included in the write command.

In some examples, the determination component 430 may be configured as or otherwise support a means for determining whether the quantity of access operations satisfies the threshold value, where the logical address is associated with the first characteristic based on the quantity of access operations satisfying the threshold value, and where the logical address is associated with a second characteristic based on the quantity of access operations failing to satisfy the threshold value. In some examples, the first characteristic includes logical addresses having undergone a first quantity of access operations. In some examples, a second characteristic includes logical addresses having undergone a second quantity of access operations different than the first quantity of access operations. In some examples, the threshold value includes a quantity of access operations performed within a duration of time.

In some examples, the reception component 425 may be configured as or otherwise support a means for receiving a command based on writing the mapping between the logical address and the corresponding physical address to the first block of memory cells. In some examples, the determination component 430 may be configured as or otherwise support a means for determining an updated quantity of access operations associated with the logical address based on receiving the command. In some examples, the writing component 440 may be configured as or otherwise support a means for writing a third indication of the updated quantity of access operations to a fifth block based on determining the updated quantity of access operations associated with the logical address.

In some examples, the reception component 425 may be configured as or otherwise support a means for receiving a command indicating that the logical address is associated with the first characteristic, where determining whether the logical address is associated with the first characteristic is based on receiving the command.

In some examples, the mapping component 435 may be configured as or otherwise support a means for writing, to a non-volatile memory of the memory system, the mapping between the logical address and the corresponding physical address and a fourth indication of a quantity of access operations associated with the logical address based at least in part on determining that the logical address is associated with the first characteristic.

In some examples, the mapping component 435 may be configured as or otherwise support a means for loading, to a sixth block of the memory system, the mapping between the logical address and the corresponding physical address and the fourth indication of a quantity of access operations associated with the logical address based at least in part on writing the mapping to the non-volatile memory, where the mapping is loaded to the sixth block based at least in part on the fourth indication.

FIG. 5 shows a flowchart illustrating a method 500 that supports segregating L2P mappings in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the wireless memory system may perform aspects of the described functions using special-purpose hardware.

At 505, the method may include receiving, at a memory system, a write command that includes data and a logical address corresponding to a physical address associated with the memory system. The operations of 505 may be performed in accordance with examples as disclosed herein. In some examples, aspects of the operations of 505 may be performed by a reception component 425 as described with reference to FIG. 4.

At 510, the method may include determining whether the logical address is associated with a first characteristic based on receiving the write command, where the first characteristic is associated with a quantity of access operations performed on the logical address satisfying a threshold value. The operations of 510 may be performed in accordance with examples as disclosed herein. In some examples, aspects of the operations of 510 may be performed by a determination component 430 as described with reference to FIG. 4.

At 515, the method may include writing, to a first block of memory cells of the memory system, a mapping between the logical address and the corresponding physical address based on determining that the logical address is associated with the first characteristic. The operations of 515 may be performed in accordance with examples as disclosed herein. In some examples, aspects of the operations of 515 may be performed by a mapping component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, a write command that includes data and a logical address corresponding to a physical address associated with the memory system; determining whether the logical address is associated with a first characteristic based at least in part on receiving the write command, where the first characteristic is associated with a quantity of access operations performed on the logical address satisfying a threshold value; and writing, to a first block of memory cells of the memory system, a mapping between the logical address and the corresponding physical address based at least in part on determining that the logical address is associated with the first characteristic.

Aspect 2: The method, apparatus, or non-transitory computer-readable medium of aspect 1, further including operations, features, circuitry, logic, means, or instructions, or any combination thereof for determining that the logical address is associated with a second characteristic based at least in part on determining that the logical address is not associated with the first characteristic and writing, to a second block of memory cells of the memory system, the mapping between the logical address and the corresponding physical address based at least in part on determining that the logical address is associated with the second characteristic.

Aspect 3: The method, apparatus, or non-transitory computer-readable medium of aspect 2, further including operations, features, circuitry, logic, means, or instructions, or any combination thereof for writing, to the memory system, a first indication of a quantity of access operations associated with the logical address based at least in part on writing the mapping between the logical address and the corresponding physical address to the second block of memory cells.

Aspect 4: The method, apparatus, or non-transitory computer-readable medium of aspect 3, where the first indication of the quantity of access operations is written as metadata to the second block of memory cells or a third block of memory cells of the memory system.

Aspect 5: The method, apparatus, or non-transitory computer-readable medium of any of aspects 2 through 4, further including operations, features, circuitry, logic, means, or instructions, or any combination thereof for sharing exclusive-or (XOR) parity data between the first block of memory cells and the second block of memory cells based at least in part on writing the mapping between the logical address and the corresponding physical address to the first block of memory cells.

Aspect 6: The method, apparatus, or non-transitory computer-readable medium of any of aspects 1 through 5, further including operations, features, circuitry, logic, means, or instructions, or any combination thereof for writing a second indication of a quantity of access operations associated with the logical address based at least in part on writing the mapping between the logical address and the corresponding physical address to the first block of memory cells, where the second indication of the quantity of access operations is written as metadata to the first block of memory cells or a fourth block of memory cells of the memory system.

Aspect 7: The method, apparatus, or non-transitory computer-readable medium of any of aspects 1 through 6, where determining whether the logical address is associated with the first characteristic includes operations, features, circuitry, logic, means, or instructions, or any combination thereof for determining a quantity of access operations associated with the logical address included in the write command.

Aspect 8: The method, apparatus, or non-transitory computer-readable medium of aspect 7, further including operations, features, circuitry, logic, means, or instructions, or any combination thereof for determining whether the quantity of access operations satisfies the threshold value, where the logical address is associated with the first characteristic based at least in part on the quantity of access operations satisfying the threshold value, and where the logical address is associated with a second characteristic based at least in part on the quantity of access operations failing to satisfy the threshold value.

Aspect 9: The method, apparatus, or non-transitory computer-readable medium of any of aspects 7 through 8, further including operations, features, circuitry, logic, means, or instructions, or any combination thereof for receiving a command based at least in part on writing the mapping between the logical address and the corresponding physical address to the first block of memory cells; determining an updated quantity of access operations associated with the logical address based at least in part on receiving the command; and writing a third indication of the updated quantity of access operations to a fifth block based at least in part on determining the updated quantity of access operations associated with the logical address.

Aspect 10: The method, apparatus, or non-transitory computer-readable medium of any of aspects 1 through 9, further including operations, features, circuitry, logic, means, or instructions, or any combination thereof for receiving a command indicating that the logical address is associated with the first characteristic, where determining whether the logical address is associated with the first characteristic is based at least in part on receiving the command.

Aspect 11: The method, apparatus, or non-transitory computer-readable medium of any of aspects 1 through 10, where the first characteristic includes logical addresses having undergone a first quantity of access operations and a second characteristic includes logical addresses having undergone a second quantity of access operations different than the first quantity of access operations.

Aspect 12: The method, apparatus, or non-transitory computer-readable medium of any of aspects 1 through 11, where the threshold value includes a quantity of access operations performed within a duration of time.

Aspect 13: The method, apparatus, or non-transitory computer-readable medium of any of aspects 1 through 12, further including operations, features, circuitry, logic, means, or instructions, or any combination thereof for writing, to a non-volatile memory of the memory system, the mapping between the logical address and the corresponding physical address and a fourth indication of a quantity of access operations associated with the logical address based at least in part on determining that the logical address is associated with the first characteristic.

Aspect 14: The method, apparatus, or non-transitory computer-readable medium of aspect 13, further including operations, features, circuitry, logic, means, or instructions, or any combination thereof for loading, to a sixth block of the memory system, the mapping between the logical address and the corresponding physical address and the fourth indication of a quantity of access operations associated with the logical address based at least in part on writing the mapping to the non-volatile memory, where the mapping is loaded to the sixth block based at least in part on the fourth indication.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
- a memory system comprising a volatile memory and a non-volatile memory; and
- a controller associated with a memory device, wherein the controller is configured to cause the apparatus to:
  - receive, at the memory system, a write command that comprises data and a logical address corresponding to a physical address associated with the memory system;
  - determine whether the logical address is associated with a first characteristic based at least in part on receiving the write command, wherein the first characteristic is associated with a quantity of access operations performed on the logical address satisfying a threshold value, and wherein, to determine whether the logical address is associated with the first characteristic, the controller is configured to cause the apparatus to:
    - determine a quantity of access operations associated with the logical address included in the write command; and
  - write, to a first block of memory cells of the memory system, a mapping between the logical address and the corresponding physical address based at least in part on determining that the logical address is associated with the first characteristic.

2. The apparatus of claim 1, wherein the controller is further configured to cause the apparatus to:
- determine that the logical address is associated with a second characteristic based at least in part on determining that the logical address is not associated with the first characteristic; and
- write, to a second block of memory cells of the memory system, the mapping between the logical address and the corresponding physical address based at least in part on determining that the logical address is associated with the second characteristic.

3. The apparatus of claim 2, wherein the controller is further configured to cause the apparatus to:
- write, to the memory system, an indication of a first quantity of access operations associated with the logical address based at least in part on writing the mapping between the logical address and the corresponding physical address to the second block of memory cells.

4. The apparatus of claim 3, wherein the indication of the first quantity of access operations is written as metadata to the second block of memory cells or a third block of memory cells of the memory system.

5. The apparatus of claim 2, wherein the controller is further configured to cause the apparatus to:

share exclusive-or (XOR) parity data between the first block of memory cells and the second block of memory cells based at least in part on writing the mapping between the logical address and the corresponding physical address to the first block of memory cells.

6. The apparatus of claim 1, wherein the controller is further configured to cause the apparatus to:

write an indication of a first quantity of access operations associated with the logical address based at least in part on writing the mapping between the logical address and the corresponding physical address to the first block of memory cells, wherein the indication of the first quantity of access operations is written as metadata to the first block of memory cells or a fourth block of memory cells of the memory system.

7. The apparatus of claim 1, wherein the controller is further configured to cause the apparatus to:

determine whether the quantity of access operations associated with the logical address satisfies the threshold value, wherein the logical address is associated with the first characteristic based at least in part on the quantity of access operations associated with the logical address satisfying the threshold value, and wherein the logical address is associated with a second characteristic based at least in part on the quantity of access operations associated with the logical address failing to satisfy the threshold value.

8. The apparatus of claim 1, wherein the controller is further configured to cause the apparatus to:

receive a command based at least in part on writing the mapping between the logical address and the corresponding physical address to the first block of memory cells;

determine an updated quantity of access operations associated with the logical address based at least in part on receiving the command; and write an indication of the updated quantity of access operations to a fifth block based at least in part on determining the updated quantity of access operations associated with the logical address.

9. The apparatus of claim 1, wherein:

the first characteristic is associated with logical addresses for which respective quantities of access operations satisfy the threshold value, and a second characteristic is associated with logical addresses for which respective quantities of access operations fail to satisfy the threshold value.

10. The apparatus of claim 1, wherein the threshold value comprises a quantity of access operations performed within a duration of time.

11. The apparatus of claim 1, wherein the controller is further configured to cause the apparatus to:

write, to the non-volatile memory of the memory system, the mapping between the logical address and the corresponding physical address and an indication of a first quantity of access operations associated with the logical address based at least in part on determining that the logical address is associated with the first characteristic.

12. The apparatus of claim 11, wherein the controller is further configured to cause the apparatus to:

load, to a sixth block of the memory system, the mapping between the logical address and the corresponding physical address and the indication of the first quantity of access operations associated with the logical address based at least in part on writing the mapping to the non-volatile memory, wherein the mapping is loaded to the sixth block based at least in part on the indication.

13. An apparatus, comprising:

a memory system comprising a volatile memory and a non-volatile memory; and a controller associated with a memory device, wherein the controller is configured to cause the apparatus to:

receive, at the memory system, a write command that comprises data and a logical address corresponding to a physical address associated with the memory system;

receive a command indicating that the logical address is associated with a first characteristic;

determine whether the logical address is associated with the first characteristic based at least in part on receiving the command indicating that the logical address is associated with the first characteristic, wherein the first characteristic is associated with a quantity of access operations performed on the logical address satisfying a threshold value; and write, to a first block of memory cells of the memory system, a mapping between the logical address and the corresponding physical address based at least in part on determining that the logical address is associated with the first characteristic.

14. A non-transitory computer-readable medium storing code comprising instructions which, when executed by a processor of an electronic device, cause the electronic device to:

receive, at a memory system, a write command that comprises data and a logical address corresponding to a physical address associated with the memory system;

determine whether the logical address is associated with a first characteristic based at least in part on receiving the write command, wherein the first characteristic is associated with a quantity of access operations performed on the logical address satisfying a threshold value, and wherein, to determine whether the logical address is associated with the first characteristic, the instructions, when executed by the processor, cause the electronic device to:

determine a quantity of access operations associated with the logical address included in the write command; and write, to a first block of memory cells of the memory system, a mapping between the logical address and the corresponding physical address based at least in part on determining that the logical address is associated with the first characteristic.

15. The non-transitory computer-readable medium of claim 14, wherein the instructions, when executed by the processor of the electronic device, further cause the electronic device to:

determine that the logical address is associated with a second characteristic based at least in part on determining that the logical address is not associated with the first characteristic; and write, to a second block of memory cells of the memory system, the mapping between the logical address and the corresponding physical address based at least in part on determining that the logical address is associated with the second characteristic.

16. The non-transitory computer-readable medium of claim 15, wherein the instructions, when executed by the processor of the electronic device, further cause the electronic device to:

write, to the memory system, an indication of a first quantity of access operations associated with the logical address based at least in part on writing the mapping between the logical address and the corresponding physical address to the second block of memory cells.

17. The non-transitory computer-readable medium of claim 16, wherein the indication of the first quantity of access operations is written as metadata to the second block of memory cells or a third block of memory cells of the memory system.

18. The non-transitory computer-readable medium of claim 15, wherein the instructions are further executable by the processor to:

share exclusive-or (XOR) parity data between the first block of memory cells and the second block of memory cells based at least in part on writing the mapping between the logical address and the corresponding physical address to the first block of memory cells.

19. A method, comprising:

receiving, at a memory system, a write command that comprises data and a logical address corresponding to a physical address associated with the memory system;

determining whether the logical address is associated with a first characteristic based at least in part on receiving the write command, wherein the first characteristic is associated with a quantity of access operations performed on the logical address satisfying a threshold value, and wherein determining whether the logical address is associated with the first characteristic comprises:

determining a quantity of access operations associated with the logical address included in the write command; and writing, to a first block of memory cells of the memory system, a mapping between the logical address and the corresponding physical address based at least in part on determining that the logical address is associated with the first characteristic.

* * * * *